(12) United States Patent
Kollarapu et al.

(10) Patent No.: US 12,494,979 B2
(45) Date of Patent: Dec. 9, 2025

(54) AUTHENTICATION SYSTEMS AND METHODS USING AN EXISTENCE CONFIRMATION RESULT

(71) Applicant: Dell Products L.P., Round Rock, TX (US)

(72) Inventors: Rajaravi Chandra Kollarapu, Allen, TX (US); Abeye Teshome, Austin, TX (US); Mohit Arora, Frisco, TX (US); Richard M. Tonry, Georgetown, TX (US); Luis Antonio Valencia Reyes, Waxahachie, TX (US); Bassem El-Azzami, Austin, TX (US); Vinodkumar Vasudev Ottar, McKinney, TX (US); Adolfo Sandor Montero, Pflugerville, TX (US); Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/649,096

(22) Filed: Apr. 29, 2024

(65) Prior Publication Data
US 2025/0337674 A1    Oct. 30, 2025

(51) Int. Cl.
*H04L 43/0876* (2022.01)
*H04L 47/70* (2022.01)
*H04L 47/78* (2022.01)

(52) U.S. Cl.
CPC ........ *H04L 43/0876* (2013.01); *H04L 47/781* (2013.01); *H04L 47/822* (2013.01)

(58) Field of Classification Search
None
See application file for complete search history.

(56) References Cited

U.S. PATENT DOCUMENTS

| | | | |
|---|---|---|---|
| 8,042,182 B2 | 10/2011 | Milani Comparetti et al. |
| 8,615,785 B2 | 12/2013 | Elrod et al. |
| 8,924,620 B2 | 12/2014 | Harriman et al. |
| 9,215,244 B2 | 12/2015 | Ayyagari et al. |

(Continued)

OTHER PUBLICATIONS

Santos et al., "gym-hpa: Efficient Auto-Scaling via Reinforcement Learning for Complex Microservice-based Applications in Kubernetes", May 8, 2023, IEEE, NOMS 2023-2023 IEEE/IFIP Network Operations and Management Symposium (2023, pp. 1-9) (Year: 2023).*

*Primary Examiner* — Davoud A Zand
(74) *Attorney, Agent, or Firm* — WOMBLE BOND DICKINSON (US) LLP

(57) ABSTRACT

Methods and systems for managing operations of a data processing system are disclosed. To manage operations of the data processing system, availability of computing resources hosted by the data processing system may be analyzed to facilitate management of hardware resource usage. To do so, policies indicating a standard for computing resource availability for the data processing system may be used to identify an action set to be performed in order to meet operation quality goals for the data processing system. By doing so, the action set may be performed to update operation of the data processing system and facilitate provisioning of desired computer-implemented services provided by the data processing system.

20 Claims, 8 Drawing Sheets

(56) References Cited

U.S. PATENT DOCUMENTS

| | | | |
|---|---|---|---|
| 9,734,169 B2 | 8/2017 | Redlich et al. | |
| 9,843,624 B1* | 12/2017 | Taaghol | H04L 45/563 |
| 9,985,847 B2* | 5/2018 | Tung | G06F 11/3442 |
| 10,176,308 B2 | 1/2019 | Mintz et al. | |
| 10,298,670 B2 | 5/2019 | Ben-Shael et al. | |
| 10,671,765 B2 | 6/2020 | Swierk et al. | |
| 11,036,902 B2 | 6/2021 | Nicholas | |
| 11,102,122 B2 | 8/2021 | Seed et al. | |
| 11,134,380 B2 | 9/2021 | Fox et al. | |
| 11,487,274 B2 | 11/2022 | Valder et al. | |
| 11,792,267 B2 | 10/2023 | Kreiner et al. | |
| 2011/0087387 A1 | 4/2011 | Safa-Bakhsh et al. | |
| 2018/0039946 A1 | 2/2018 | Bolte et al. | |
| 2021/0034048 A1 | 2/2021 | Hajizadeh | |
| 2021/0073211 A1 | 3/2021 | Wright, Sr. | |
| 2021/0357255 A1* | 11/2021 | Mahadik | G06F 11/3006 |
| 2021/0385159 A1* | 12/2021 | Mehmedagic | H04L 41/0895 |
| 2022/0038659 A1 | 2/2022 | Michel | |
| 2023/0199868 A1* | 6/2023 | Kedalagudde | H04L 67/141 |
| | | | 370/328 |

* cited by examiner

US 12,494,979 B2

AUTHENTICATION SYSTEMS AND METHODS USING AN EXISTENCE CONFIRMATION RESULT

FIELD

Embodiments disclosed herein relate generally to managing operations of data processing systems. More particularly, embodiments disclosed herein relate to systems and methods to manage operations of a data processing system of the data processing systems using at least out-of-band components.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
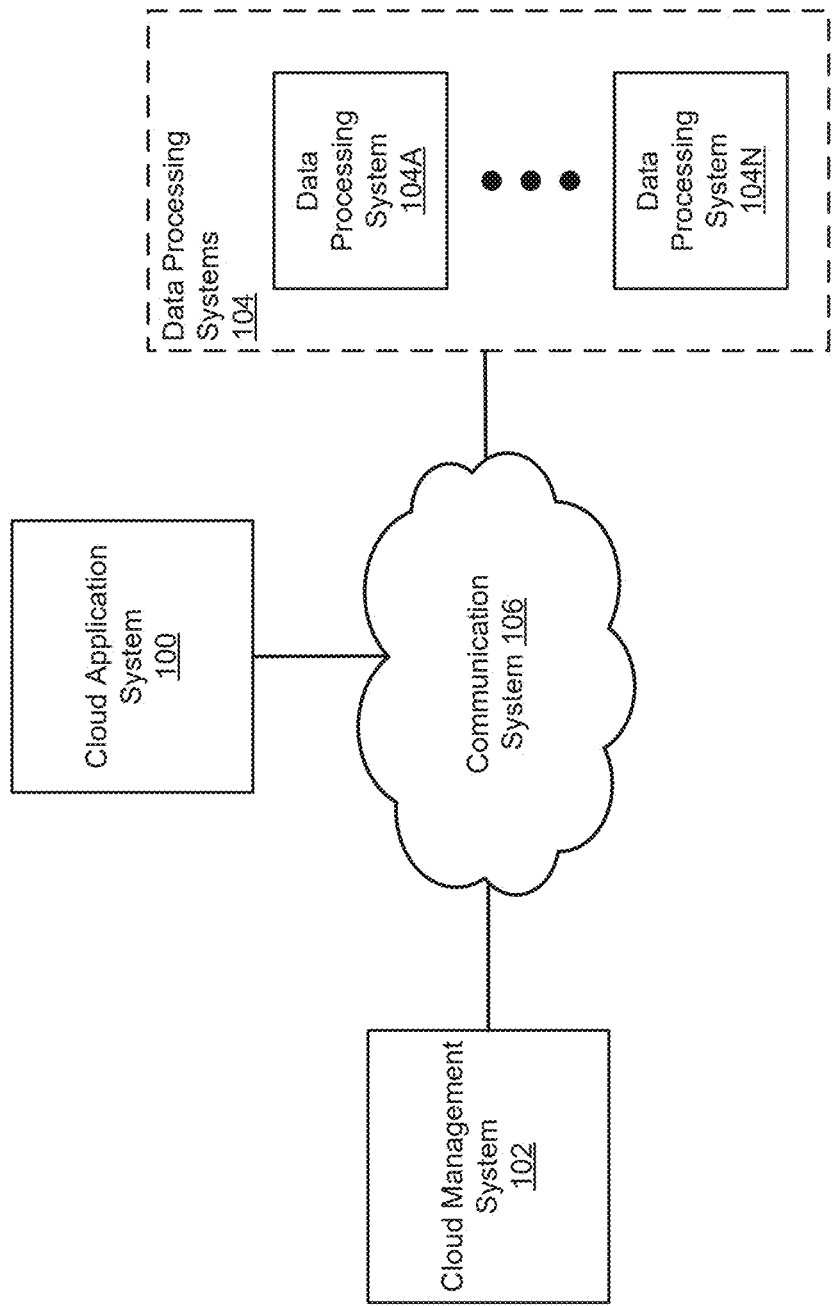
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. The data processing systems may provide computer-implemented services to any type and number of other devices and/or users of the data processing systems. The computer-implemented services may include any quantity and type of such services.

To provide the computer-implemented services, the data processing system may need to operate in a manner conducive to, for example, execution of applications that provide the desired computer-implemented services. To provide the computer-implemented services, the applications may utilize certain hardware resources and/or software components hosted by the hardware resources. Over time, a type and/or quantity of the computer-implemented services desired by a user of the data processing system may change.

To update operation of the applications (and/or other components of the data processing system) and, therefore, to provide updated computer-implemented services, a management agent may be hosted by the hardware resources. The management agent may include a program responsible for facilitating use of the hardware resources by various applications to perform the computer-implemented services.

However, the management entity may lack the capabilities (e.g., due to insufficient hardware resources, depowering of the in-band components, etc.) to identify and implement modifications to the hardware resources and/or software components in order to update operations of the data processing system and provide the desired computer-implemented services for a user of the data processing system. In addition, if the hardware components of the data processing system are depowered, the management agent may be nonfunctional.

Limited capability and/or reduced functionality of the management agent and/or other in-band components of the data processing systems may impede identification of software modifications and implementation of the modifications to provide the computer-implemented services as desired by a user operating the data processing system.

To identify software modifications necessary to provide the desired computer-implemented services, the data processing system may include a management controller. The management controller may operate independently from the hardware resources of the data processing system and may be distinct from the hardware resources. Therefore, the management controller may provide management functionalities for the data processing system regardless of a status of one or more in-band components (e.g., the hardware resources).

In addition, the management controller may cooperatively perform management services with cloud management systems by receiving information from and/or providing information to the cloud management systems. The information may include computing resource availability data and software load data of the data processing system usable to identify a version of an application (e.g., modifications to software components) for installation on the data processing system to improve performance of the operations of the data processing systems.

In an embodiment, a method of managing operation of a data processing system is provided. The method may include: identifying an occurrence of a trigger event for the data processing system; based on the occurrence: obtaining, by a management controller of the data processing system, computing resource availability data for computing resources for providing computer implemented services, obtaining, by an agent hosted by the data processing system, a list of software components hosted by hardware resources and computing resources consumed by each software component in the list of software components; performing a software load analysis process using, at least in part, the computing resource availability data, the list of software components, the computing resources consumed by each of the software components, and a policy library, to identify an action set to be performed to meet operation quality goals for the data processing system; and performing the action set to update operation of the data processing system to enable the data processing system to provide the computer implemented services in a manner that meets the operation quality goals for the data processing system.

In an instance of the identifying where the occurrence of the trigger event may be an administrator sending instructions to the data processing system, the instructions may indicate performance of a management process by the data processing system.

In an instance of the identifying where the occurrence of the trigger event may be based on a scheduled point in time.

Obtaining the computing resource availability data may include: providing, via a management controller of the data processing system, a request to the agent hosted by the hardware resources, the request indicating a portion of computing resource availability data for the data processing system; and receiving, by the management controller and from the agent, the portion of computing resource availability data.

The computing resource availability data may include available data for at least one computing resource from a group of computing resources consisting of: processing resources provided by at least one processor of the hardware resources; memory resources provided by at least one memory devices of the hardware resources; persistent storage resources provided by at least one storage device of the hardware resources; and communication resources provided by at least one communication device of the hardware resources.

Obtaining the list of the software components and the computing resources consumed by each of the software components may include: receiving, by the management controller and via an out-of-band communication channel, instruction from a cloud management system; providing, by the management controller and to the agent, the instruction to the agent to obtain the list of the software components and the computing resources consumed by each of the software components; and receiving, by the management controller and from the agent and in response to providing the instruction, a data package comprising data responsive to the instruction.

The data responsive to the instruction may include the list of the software components and the computing resources consumed by each of the software components.

Performing the software load analysis process may include: identifying policies for the data processing system, the policies being stored in the policy library and each policy of the policies indicating a standard for computing resource availability for each of the computing resources; performing, for each policy of the policies, a comparison between the standard indicated by a corresponding policy and the computing resources consumed by each of the software components, and the computing resource availability data to obtain a list of violated policies of the policies; in an instance of the performing where the list of violated policies is not empty: for each policy of the list of violated policies, identifying a remediation course associated with the respective policy to obtain remediation courses; and using the remediation courses to obtain the action set to be performed in order to meet the operation quality goals.

Each of the policies may specify a corresponding standard and the remediation course when the standard is not met.

The policy library may store policies for the data processing system usable to manage the hardware resource usage in order to meet the operation quality goals, and the operation quality goals for the data processing system setting minimum requirements for the computing resources to allow a user's perceived operation of the data processing system to meet a user experience standard.

The action set may specify removal of an existing instance of an application and installation of a lower resource consumption version of the application.

The data processing system comprises hardware resources and a network module may be adapted to separately advertise network endpoints for the management controller and the hardware resources of the data processing system, the network endpoints may be usable by a server to address communications to the hardware resources using an in-band communication channel and the management controller using the out-of-band communication channel.

The management controller and the network module may be on separate power domains from the hardware resources so that the management controller and the network module may be operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
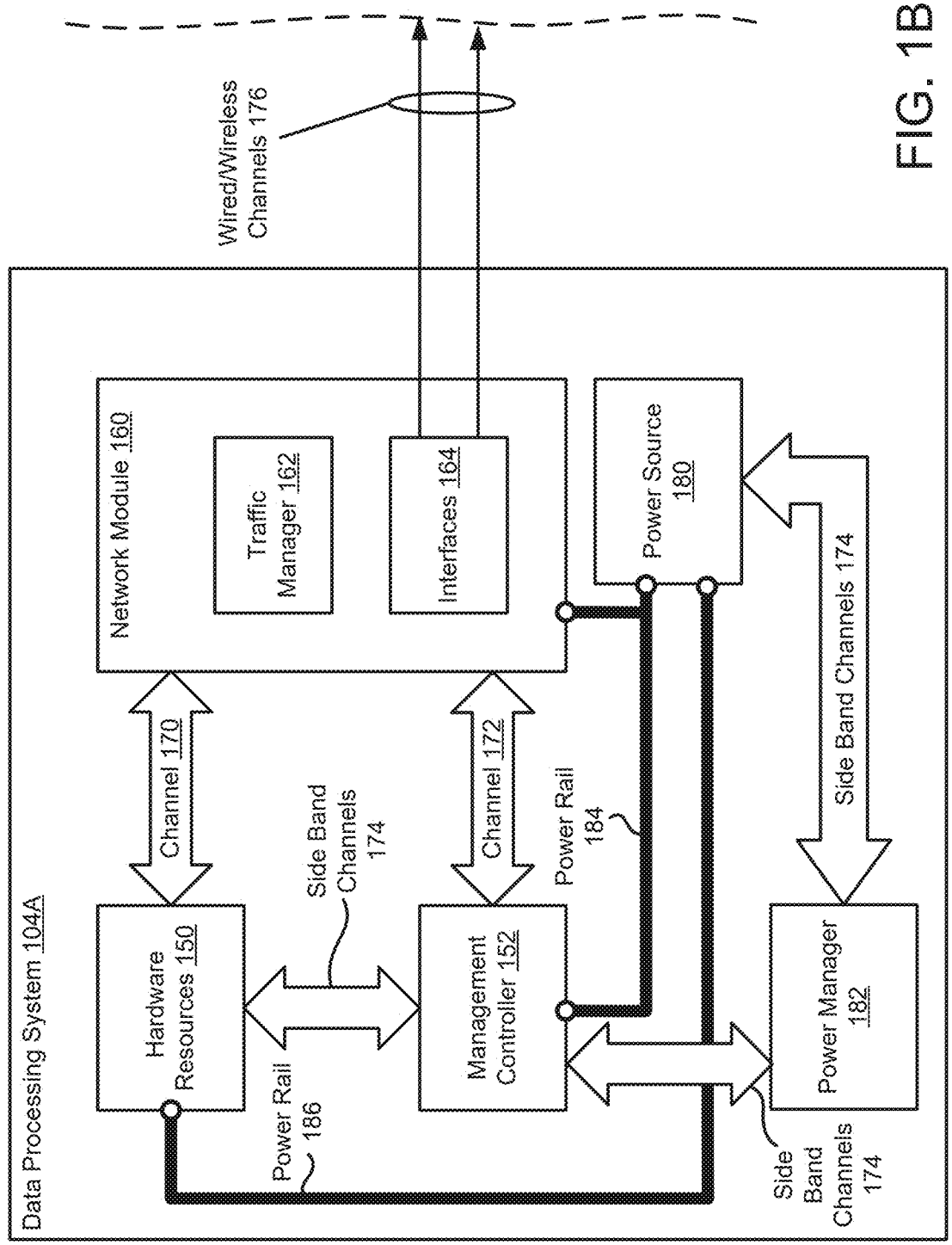
FIG. 1B shows a block diagram illustrating hardware resources of a data processing system in accordance with an embodiment.
Figure 1C:
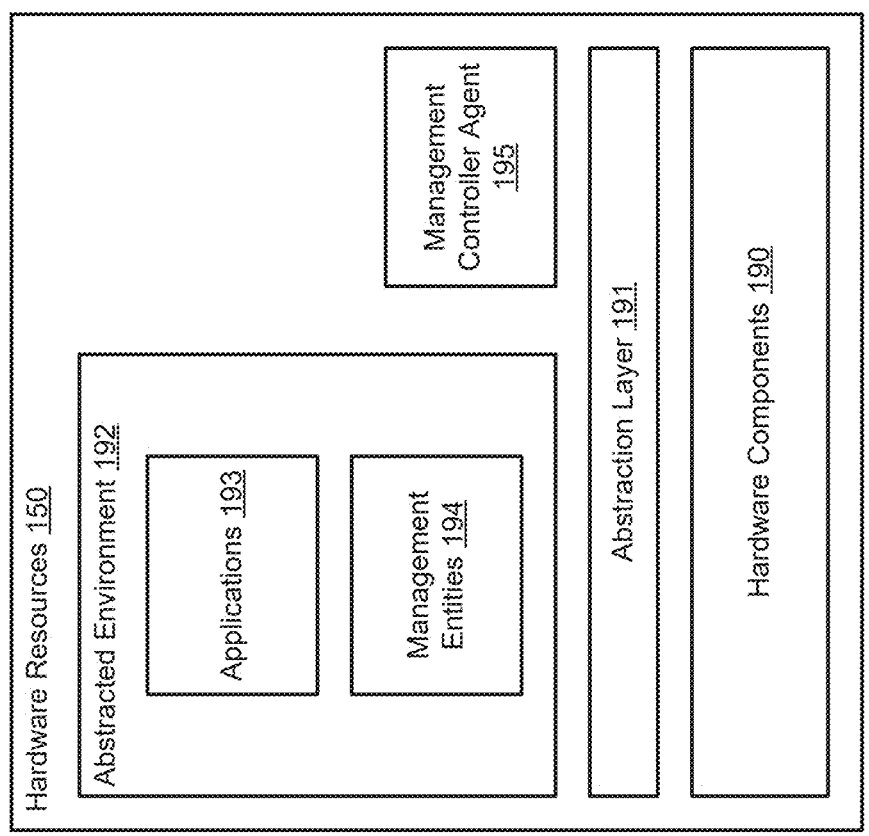
FIG. 1C shows a block diagram illustrating a data processing system in accordance with an embodiment.

Turning to FIG. 1A, a block diagram illustrating a system in accordance with an embodiment is shown. The system shown in FIG. 1A may provide for management of operations of data processing systems that may provide, at least in part, computer-implemented services. The system may include any number of data processing systems 104 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIGS. 1B-1C for additional details regarding data processing systems 104.

The computer-implemented services may be provided, at least in part, by hardware resources of data processing systems 104 and the computer-implemented services may be desired by a user of data processing systems 104. Over time, the type and/or quantity of the computer-implemented services desired by the user may change. To accommodate modification to the provided computer-implemented services, operation of the hardware resources and/or software components hosted by the hardware resources (e.g., applications) may be modified.

To update operation of the applications (and/or other components of the data processing system) and, therefore, to provide updated computer-implemented services, a management agent may be hosted by the hardware resources. The management agent may include a program responsible for overseeing how the applications access the hardware resources while providing the computer-implemented services. By modifying the hardware resources and/or software components available for use in performing the computer-implemented services, operation of the data processing system may be modified.

However, the management entity may lack the capabilities (e.g., due to insufficient resources, depowering of the in-band components utilized by the management entity to perform the modifications, etc.) to identify the necessary modifications to the software components hosted by the hardware resources (e.g., applications) that may optimize the operation of the data processing system. For example, based on the application type (e.g., website applications, containerized applications, etc.), usage of the hardware resources of the data processing systems 104 may differ (e.g., use of different computing components of the data processing systems) and the management entity may not have enough computing resources (e.g., processing resources, memory resources, and/or any other computing resources) to consistently monitor, identify, and implement modifications to the hardware resources in order to provide the computer-implemented services desired by the user.

In general, embodiments disclosed herein may provide methods, systems, and/or devices for managing operation of a data processing system. To manage operation of the data processing system, a system in accordance with an embodiment may obtain, using at least in part out-of-band components hosted by the data processing system, available computing resources and software load (e.g., computing resources consumed by each of the software components hosted by the hardware resources) for the data processing system for analysis in order to identify an action set to be performed by the data processing system to meet operation quality goals for the data processing system. To identify the action set to be performed by the data processing system, a cloud management system may perform a software load analysis process to determine whether policies (e.g., indicating standards to different computing resources of data processing systems) are violated (e.g., the available computing resources and software load does not meet the standards). Based on the determination that one or more policies are violated, remediation courses associated with each of the violated policies may be used to obtain the action set to be performed in order for the data processing system to meet the operation quality goals (e.g., requirements to meet a user experience standard).

By doing so, embodiments disclosed herein may facilitate continued implementation of modifications to hardware resource usage in order for the data processing systems to provide the desired computer-implemented services. By utilizing out-of-band components of the data processing system and analyzing computing resources of the data processing system, usage of the hardware resources and/or software components (e.g., applications) may be managed automatically to meet an operation quality goals and to improve the user's experience during operation of the data processing system.

To provide the above noted functionality, the system of FIG. 1A may include cloud application system 100, cloud management system 102, and data processing systems 104, and communication system 106. Each of these components is discussed below.

Data processing systems 104 may provide desired computer-implemented services and perform cooperative processes with other devices (e.g., cloud application system 100, cloud management system 102, and/or any other devices not shown in FIG. 1A) to identify modifications of software components based on an amount of computing resources available and to implement the modifications to the hardware resources and/or software components. To do so, data processing systems 104 may (i) obtain, by a management controller of the data processing systems, data regarding available computing resources (e.g., an amount of available hardware resources of data processing systems 104), (ii) obtain, by an agent hosted by the data processing systems, a list of software components hosted by the hardware resources and computing resources consumed by each of the software components, (iii) communicate, using out-of-band communication channels, the obtained data to other devices (e.g., cloud application system 100, cloud management system 102, etc.), (iv) receive instructions indicating performance of an action set, and/or (v) may include other operations. For example, data processing systems 104 may interact with cloud application system 100 to receive instructions to perform an action set specifying modifications of software components (e.g., applications) in order to update operations of data processing systems 104, and therefore, provide the computer-implemented services as desired by a user of the data processing systems.

Cloud application system 100 may provide, at least in part, application management services. To provide application management services for data processing systems 104, cloud application system 102 may (i) store application data useable by data processing systems, (ii) receive instructions from cloud management system 102 to manage application data for data processing systems 104, and/or (iii) may include other operations. Cloud application system 100 may be implemented using a physical device (e.g. data processing systems, user devices, etc.) that communicates with cloud management system 102 and/or data processing systems 104 via communication system 106. Cloud application system 100 may interact with cloud management system 102 to receive instructions regarding modifications to operation of data processing systems 104.

By doing so, cloud application system 100 may facilitate modifications of the hardware resources and/or software components hosted by the hardware resources (e.g., applications) to update operations of data processing systems 104 in a manner that meets operation quality goals for data processing systems 104.

Cloud management system 102 may, in addition to other services, may cooperate in management services of data processing systems 104. To do so, cloud management system 102 may (i) obtain computing resource availability data for computing resources of data processing systems 104, (ii) obtain a list of software components hosted by hardware resources (e.g., of data processing systems 104) and computing resources consumed by each software component in the list of software components, (iii) perform a software load analysis using, at least in part, the computing resource availability data, the list of software components, the computing resources consumed by each of the software components and a policy library to identify an action set to be performed, and/or (iv) may include other operations.

By doing so, cloud management system 102 may facilitate automation of identifying managing usage of hardware resources and/or software components of data processing systems.

While illustrated in FIG. 1A as including cloud application system 100 and cloud management system 102 as separate components, a system in accordance with an embodiment may include a single component that performs the functionality of both components (e.g., cloud application system 100 and cloud management system 102).

Figure 2A:
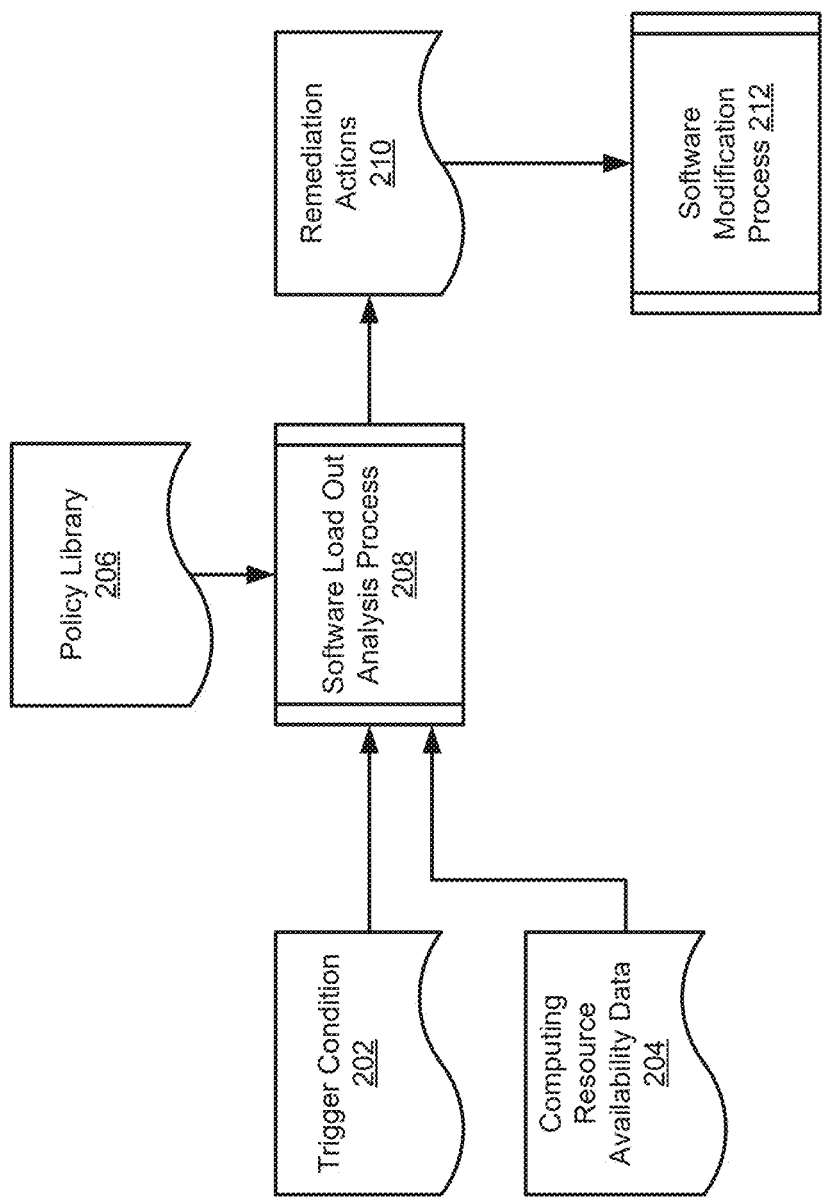
FIGS. 2A-2C show data flow diagrams in accordance with an embodiment.
Figure 2B:
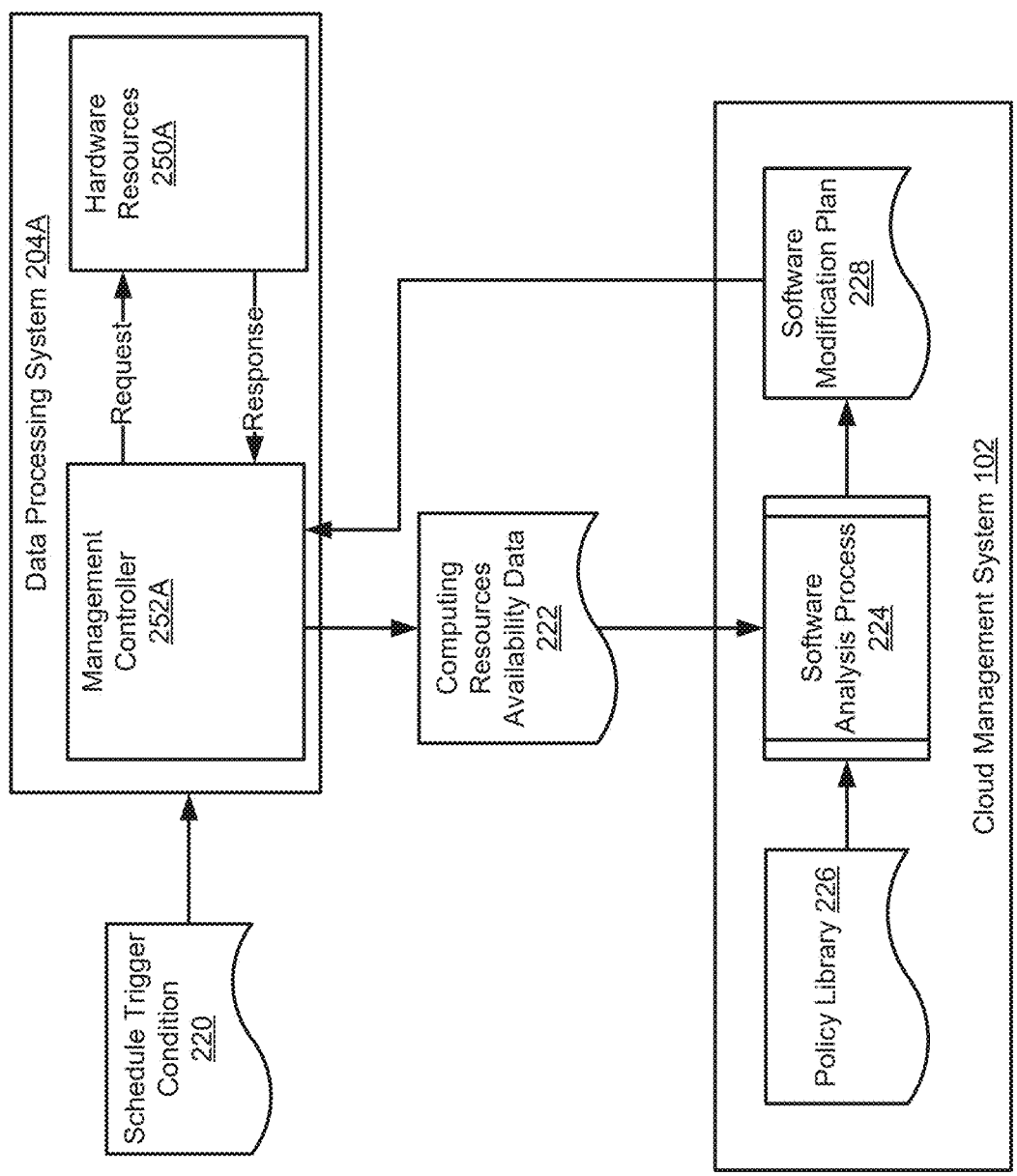
Figure 2C:
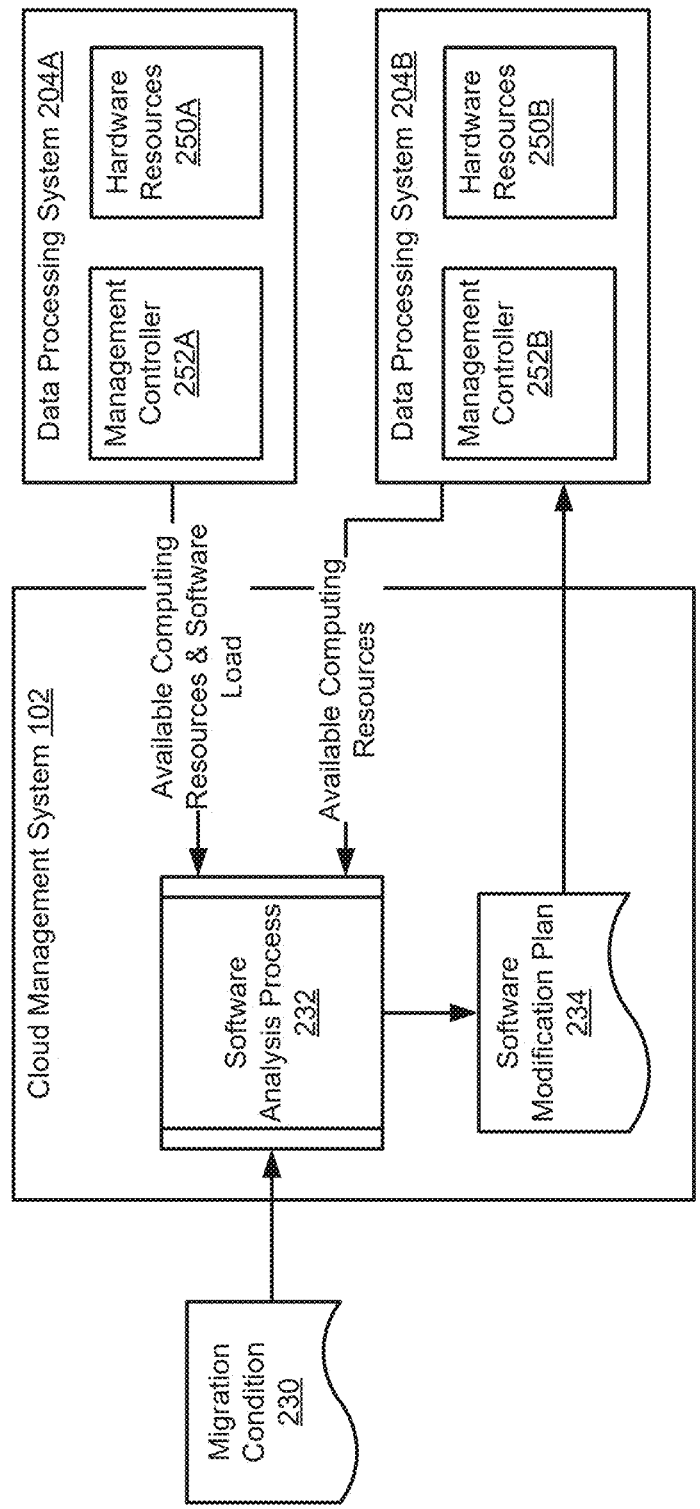

Refer to FIGS. 2A-2C for additional details regarding management of software loads of data processing systems based on various occurrences of trigger events and performing management services of the data processing systems.

Figure 3:
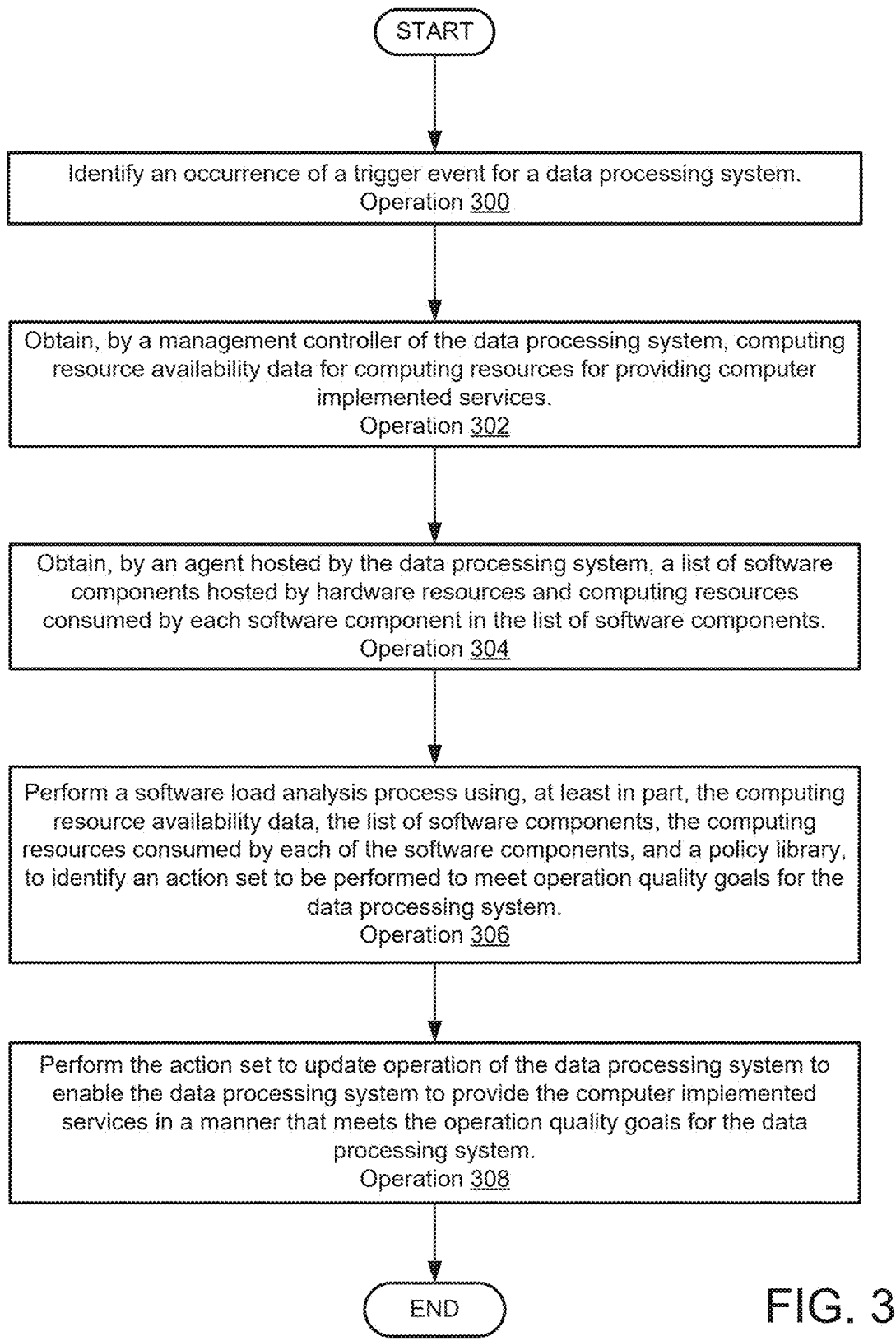
FIG. 3 shows a flow diagram illustrating a method of managing operations of a data processing system in accordance with an embodiment.

When providing their functionality, any of cloud application system 100, cloud management system 102, and data processing systems 104 may perform all, or a portion, of the processes, interactions, and methods illustrated in FIGS. 2A-3.

Any of cloud application system 100, cloud management system 102, and data processing systems 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 104 and device management system 102).

While illustrated in FIG. 1A as including a limited number of specific components, a system in accordance with an embodiment may include fewer, additional, and/or different components than those illustrated therein.

Refer to FIG. 1B for additional details regarding the management controller, network module, out-of-band communication channel, and/or hardware resources of data processing systems 104.

Turning to FIG. 1B, a diagram illustrating data processing system 104A in accordance with an embodiment is shown. Data processing system 104A may be similar to any of data processing systems 104 shown in FIG. 1A.

To provide computer-implemented services, data processing system 104A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 104A) to another device via any number of intermediate networks (e.g., via wired/wireless channels 176 that are part of the networks).

In addition, different configurations of hardware resources 150 and/or software resources may be implemented by data processing system 104A based on the type of computer-implemented services that are to be provided. Modifications to configurations of hardware resources 150 and/or the software resources may lead to downtime for data processing system 104A and may consume network bandwidth of channel 170.

To reduce the downtime of data processing system 104A and to reduce the likelihood of the applications and/or other in-band entities from being indirectly compromised, data processing system 104A may include management controller 152 and network module 160. Each of these components of data processing system 104A is discussed below.

Management controller 152 may be implemented, for example, using a system on a chip or other type of independently operating computing device (e.g., independent from the in-band components, such as hardware resources 150, of a host data processing system 104A). Management controller 152 may provide various management functionalities for data processing system 104A. For example, management controller 152 may monitor various ongoing processes performed by the in-band component, may manage power distribution, thermal management, and/or other functions of data processing system 104A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 104A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 104A may include network module 160. Network module 160 may provide communication services for in-band components and out-of-band components (e.g., management controller 152) of data processing system. Specifically, an out-of-band communication channel (e.g., 172) that services management controller 152 and an in-band communication channel (e.g., 170) that services hardware resources 150 may run through network module 160. Network module 160 may host a TCP/IP stack to facilitate network communications via the out-of-band communication channel. To do so, network module 160 may include traffic manager 162 and interfaces 164.

Traffic manager 162 may include functionality to (i) discriminate traffic directed to various network endpoints advertised by data processing system 104A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

Specifically, network module 160 may separately advertise network endpoints for management controller 152 and hardware resources 150. The network endpoints may be usable by entities throughout a domain to which data processing system 104A is onboarded to address communications to hardware resources 150 using the in-band communication channel (e.g., 170) and management controller 152 using the out-of-band communication channel (e.g., 172).

To provide its functionality, management controller 152 may: (i) obtain, via an out-of-band communication channel (e.g., 172), a request, (ii) attempt, based on the request and using at least a sideband channel (e.g., 174) between management controller 152 and hardware resources 150, to perform the action set, (v) notify, via an out-of-band communication channel (e.g., 172) and based at least in part on the attempt to perform the action set, cloud server 100 of at least an outcome of the attempt to perform the action set, and/or (vi) perform other actions.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in-band components and out-of-band components of data processing system 104A may appear to be two independent network entities, that may independently addressable, and otherwise unrelated to one another.

To facilitate management of data processing system 104A over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 104A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, components of data processing system 104A may perform all, or a portion, of the methods and operations illustrated in FIGS. 2A-3.

While illustrated in FIG. 1B with a limited number of specific components, a system may include additional, fewer, and/or different components without departing from embodiments disclosed herein.

Turning to FIG. 1C, to provide computer-implemented services, hardware resources 150 may host applications 193 and management entities 194. Management entities 194 may include, for example, drivers, operating systems, and/or other entities that facilitate operation of applications 193 by facilitating use of hardware resources 150. Hardware resources 150 may include processors, memory modules, storage devices, and/or other types of hardware components usable to provide computer-implemented services.

Applications 193 may provide any quantity and type of computer-implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 191 and/or other entities, (vi) adjust distribution of use of hardware components 190 by the abstracted environment, and/or (vii) perform other types of management actions through which information regarding the operation of entities hosted by abstracted environment 192 may be collected.

As discussed above, the components of FIGS. 1A-1C may perform various methods to manage operation of a data processing system. FIGS. 2A-3 may illustrate examples of methods that may be performed by the components of FIGS. 1A-1C. For example, a management controller similar to management controller 152 may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 202, 206, etc.) is used to represent data structures, a second set of shapes (e.g., 208, 224, etc.) is used to represent processes performed using and/or that generate data, and a third set of shapes (e.g., 250A, 252A, etc.) is used to represent special purpose hardware components.

Turning to FIG. 2A, a first data flow diagram illustrating data flows, data processing, and/or other operations that may be performed by the system of FIGS. 1A-1C in accordance with an embodiment is shown. Any of the methods described in FIG. 2A may be performed by any of the components shown in FIGS. 1A-1C. The first data flow diagram may illustrate data used in and data processing performed in managing software load (e.g., computing resources consumed by software components) of a data processing system.

To manage the software load of the data processing system, software load out analysis process 208 may be performed to identify an action set to be performed in order to meet operation quality goals for the data processing system. To initiate software load out analysis process 208, trigger condition 202 may be obtained. Trigger condition 202 may include any type and quantity of information indicating an occurrence of a trigger event. The trigger event may be initiated by various factors. For example, trigger condition 202 may include instructions, received from an administrator (e.g., of the data processing system), indicating performance of a management process by the data processing system. As an additional example, trigger condition 202 may include instructions for the data processing system to collect computing resource availability data 204 based on a timed scheduled (e.g., scheduled point in time). Refer to FIG. 2B for additional details regarding a scheduled trigger condition.

Trigger condition 202 may be used in software load out analysis process 208 to analyze the computing resource usage of the data processing system and/or in other processes (not shown), such as analyzing telemetry data in management processes.

Once obtained, trigger condition 202 may initiate software load out analysis process 208. Software load out analysis process 208 may include (i) obtaining computing resources availability data for the data processing system, (ii) identifying policies for the data processing system stored in policy library 206, (iii) performing, for each policy of the policies, a comparison between a standard for computing resources availability indicated by a corresponding policy and computing resources availability data, and/or (iv) any other processes to perform analysis of the software load out.

During software load out analysis process 208, computing resources availability data 204 may be (i) obtained based on the identification of trigger condition 202, (ii) obtained from the data processing system (and/or components of the data processing system), and (iii) subjected to a comparison process using policies (e.g., obtained via policy library 206) corresponding to a standard for computing resource availability.

Computing resource availability data 204 may include various types of data collected by hardware resources and/or software components (e.g., hosted by the hardware resources) of the data processing system.

For data collected by the hardware resources of the data processing system, computing resource availability data 204 may include available data for one or more computing resources of the data processing system. For example, the computing resources may include: (i) processing resources provided by at least one processor of the hardware resources, (ii) memory resources provided by at least one memory devices of the hardware resources, (iii) persistent storage resources provided by at least one storage device of the hardware resources, (iv) communication resources provided by at least one communication device of the hardware resources, and/or (v) any other computing resources of the data processing system.

For data collected from the software components of the data processing system, computing resource availability data 204 may include: (i) a list of software components hosted by the hardware resources, (ii) the computing resources consumed by each of software component in the list of software components, and/or (iii) any other data regarding the software components of the data processing system.

Once obtained, as a part of performing software load analysis process 208, computing resource availability data 204 may be subjected to a comparison process using policies (e.g., obtained via policy library 206) corresponding to a standard for computing resource availability for the respective data processing system. Policies for the data processing system may be stored in policy library 206 and each policy may: (i) indicate a standard for computing resource availability for each of the computing resources of the respective data processing system, and (ii) a remediation course when the standard is not met. For example, a first policy for data processing system 104A may be identified (e.g., via policy library 206) and may specify a requirement that at least fifteen percent of processing resources (e.g., one of the computing resources of data processing system 104A) provided by a processor of the hardware resources to be available in order to be incompliance with the policy.

The policies for the respective data processing system may be identified and used in the comparison process to identify whether any policies are violated (e.g., the standard for computing resource availability is not met). For example, the standard of computing resource availability indicated by a corresponding policy may be compared to a portion of computing resource availability data 204 (e.g., available data for at least one computing resource and the computing resources consumed by each of the software components). Continuing the above example, a portion of computing resource availability data 204 may indicate that five percent of the processing resources is available and when compared to the first policy (e.g., the standard for processing resources for data processing system 104A), may be in violation of the first policy (e.g., since the available data for processing resources does not meet the fifteen percent standard).

By performing the comparison process, the identified policies, where the standard for computing resource availability is not met, may be used to obtain a list of violated policies. Each policy identified from the list of violated policies may be used to obtain remediation actions 210. For example, the remediation course (e.g., modification to computing resource usage) associated with each violated policy (e.g., from the list of violated policies) may be identified and used to obtain an action set (e.g., remediation actions 210). For example, if the first policy regarding the processing resources is violated (e.g., data processing system 104A is using more processing resources than the standard) when performing a local version of an application (e.g., software component of the hardware resources), remediation actions 210 may include instructions to remove the local version of the application and to install a remote and/or virtual desktop infrastructure version of the application.

Remediation actions 210 may be used to efficiently modify the computing resources consumed by each of the software components to increase the available computing resources of the data processing system. Remediation actions 210 may include instructions to remove an existing instance of application (e.g., application data from hardware and/or software components) and to install a lower resource consumption version of the application (e.g., decreasing the computing resources consumed by the software components to perform the application).

Remediation actions 210 may be used during software modification process 212. Software modification process 212 may be performed to manage hardware resource usage (e.g., of the data processing system) in order to meet the operation quality goals of the data processing system (e.g., minimum requirements for the computing resources to allow a user's perceived operation of the data processing system to meet a user experience standard). During software modification process 212, modifications to the hardware resources and/or software components (e.g., as specified by remediation actions 210) may be automatically implemented by the data processing system to update operation of the data processing system. Continuing the above example, Through software modification process 212, automation of the software modifications to the data processing system may be enabled to provide the computer-implemented services in a manner that meets the operation quality goals for the data processing system.

Turning to FIG. 2B, a second data flow diagram illustrating data flows, data processing, and/or other operations that may be performed by the system of FIGS. 1A-1C in accordance with an embodiment is shown. The second data flow diagram may illustrate data used in and data processing performed in initiating management of software load of a data processing system based on a scheduled trigger condition.

To initiate management of the software load of the data processing system based on a scheduled trigger condition, schedule trigger condition 220 may be obtained by management controller 252A. Schedule trigger condition 220 may include information indicating a trigger event instructing management controller 252A to collect data (e.g., relevant to computing resources of data processing system 204A) based on a scheduled point in time (e.g., set by an administrator of the data processing system).

Once obtained, management controller 252A may use schedule trigger condition 220 to generate a request (e.g., for the collection of data) and provide the request to hardware resources 250A using, at least in part, a sideband communication channel (e.g., sideband channel 172 shown in FIG. 1B). For example, management controller 252A may provide the request, via the sideband communication channel, to an agent hosted by hardware resources 250A. The request may indicate instructions to obtain computing resource availability data including an amount of available computing resources, a list of software components, an amount of computing resources consumed by each of the software components, and/or any other information.

Once obtained, hardware resources 250A may read the request and based on the instructions specified by the request, initiate collection of data (e.g., computing resources availability, a list of software components, computing resources consumed by each of the software components, etc.) for data processing system 204A. For example, the request may include instructions for the agent (e.g., hosted by hardware resources 250A) to collect data regarding available processing resources provided by a processor of hardware resources 250A.

In response to the request, hardware resources 250A may generate a response including the data responsive to the instructions specified by the request and provide the response to management controller 252A, using at least the sideband communication channel. Continuing the above example, in response to the request, the agent hosted by hardware resources 250A may generate a data package including a list of software components hosted by hardware resources 250A, an amount of computing resources consumed by each of the software components (e.g., applications), and/or an amount of available computing resources (e.g., an amount of available processing resources, memory resources, persistent storage resources, etc.) of data processing system 204A.

Management controller 252A may obtain computing resources availability data 222, based on the response, and provide computing resources availability data 222 to cloud management system 102 to determine whether the computing resources of data processing system 204 meets a standard for computing resources specified by policies (e.g., relevant to data processing system 204A) stored in policy library 226.

To determine whether the computing resources of data processing system 204 meet a standard for computing resources, software analysis process 224 may be performed. During software analysis process 224, computing resources availability data 222 may be analyzed by comparing a standard for computing resources to the available computing resources and computing resources consumed by each software component hosted by hardware resources 250A. To perform the comparison, cloud management system 102 may identify policies relevant to data processing system 204A stored in policy library 226, and compare each standard for computing resources (e.g., specified by each policy relevant to the data processing system) to computing resources availability data 222. Cloud management system 102 may identify one of more policies that are in violation by data processing system 204A based on the standard of the corresponding policy not being met. For example, cloud management system 102 may identify the standard for processing resources of data processing system 204A to not be met when the computing resources of a processor (e.g., central processing unit of data processing system 204A) exceeds seventy percent usage.

Based on the identified violated policies, cloud management system 102 may obtain software modification plan 228. Software modification plan 228 may include instructions to remediate the violation of each standard for computing resources identified by the violated policies. For example, software modification plan 228 may include instructions to remove an application hosted by hardware resources 250A and to install a version of the application that uses lower processing resources of data processing system 204A.

Software modification plan 228 may be provided to management controller 252A by cloud management system 102 using, at least, an out-of-band communication channel (e.g., out-of-band channel 174 shown in FIG. 1B) and utilized by management controller 252A to perform the modifications to update operations of hardware resources 250A. Therefore, enabling data processing system 204A to provide computer-implemented services in a manner that meets the operation quality goals for data processing system 204A.

Turning to FIG. 2C, a third data flow diagram illustrating data flows, data processing, and/or other operations that may be performed by the system of FIGS. 1A-1C in accordance with an embodiment is shown. The third data flow diagram may illustrate data used in and data processing performed in initiating management of software load of a data processing system based on an occurrence of a migration event.

To initiate management of software load of a data processing system based on an occurrence of a migration event, migration condition 230 may be obtained. Migration condition 230 may include information indicating that migration of devices (e.g., transferring from a first device to a second device) is initiated. For example, data processing system 204A and data processing system 204B may include personal computing devices, such as laptops, and a user of data processing system 204A may obtain a new laptop (e.g., data processing system 204B) and as such, the user may desire to transfer operations of data processing system 204A (e.g., including applications) to data processing system 204B.

Migration condition 230 may be used in software analysis process 232 to initiate the collection of data from the respective devices (e.g., data processing system 204A and data processing system 204B) in order to determine whether modification to software components (e.g., currently hosted by data processing system 204A) need to be implemented on data processing system 204B. For example, current versions of applications (e.g., software load out of data processing system 204A) may be identified and used to determine whether data processing system 204B has sufficient computing resources available to perform those versions of the applications.

Software analysis process 232 may include: (i) ingesting available computing resources and software load from a first device (e.g., data processing system 204A), (ii) ingesting available computing resources from a second device (e.g., data processing system 204B), and (iii) comparing the data obtained from the first device and the second device to identify whether modifications to any software components previously hosted by the first device may be implemented by the second device due to lack of computing resources by the second device.

Software modification plan 234 may include instructions to management controller 252B to modify operations of data processing system 204B in order to meet operation quality goals for the data processing system. For example, if it is determined that data processing system 204B has the sufficient computing resources available to perform the current version of the applications (e.g., hosted by data processing system 204A), then software modification plan 234 may include instructions to install those versions of the applications by data processing system 204B. However, if it is determined that data processing system 204B has insufficient computing resources available (e.g., in violation of one or more policies) to perform the current version of the applications, then software modification plan 234 may include instructions to modify the software load out, for example, by installing a lower consumption version of the applications.

Cloud management system 102 may provide software modification plan 234 to management controller 252B using, at least, the out-of-band communication channel (e.g., out-of-band channel 172 shown in FIG. 1B) in order to implement the appropriate version of applications by data processing system 204B. Software load out from data processing system 204A may be used to identify the software components to install on data processing system 204B (what piece of software are on data processing system 204A currently and lead to those available computing resources). By implementing software modification plan 234, data processing system 204B may be able to provide the computer-implemented services in a manner that meets operation quality goals (e.g., meets the minimum requirements for the computing resources to allow a user's perceived operation of the data processing system to meet a user experience standard).

Thus, via processes and interactions shown in FIGS. 2A-2C, hardware resource usage of data processing systems may be managed to meet operation quality goals that are based on minimum requirements for computing resources to allow a user's (e.g., user of the data processing systems) perceived operation of the data processing systems to meet a user experience standard.

As discussed above, the components of FIGS. 1A-2C may perform various methods to manage the operation of data processing systems. FIG. 3 illustrates methods that may be performed by the components of FIGS. 1A-2C. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of managing operations of a data processing system in accordance with an embodiment is shown. The method may be performed by any of data processing systems 100, device management system 102, and/or other entities without departing from embodiments disclosed herein.

At operation 300, an occurrence of a trigger event for a data processing system may be identified. The occurrence of the trigger event may be identified by: (i) obtaining a notification that the occurrence of the trigger event has occurred for the data processing system from another entity, (ii) performing a management process, by the data processing system (and/or one of the components of the data processing system), based on a time schedule and obtaining an indication of a trigger event, and/or (iii) any other methods.

Based on the occurrence of the trigger event for the data processing system, the methods described below (e.g., operations 302-308) may be performed.

At operation 302, computing resource availability data for computing resources for providing computer implemented services may be obtained. The computing resource availability data may be obtained by: (i) providing, via a management controller of the data processing system, a request to the agent hosted by the hardware resources, the request indicating a portion of computing resource availability data for the data processing system, (ii) receiving, by the management controller and from the agent, the portion of computing resource availability data, and/or (iii) any other methods.

Providing the request to the agent hosted by the hardware resources may include transmitting the request over a sideband communication channel to the agent.

Receiving the portion of computing resource availability data may include receiving, via the sideband communication channel, a notification from the agent in the form of a message and reading the message, by the management controller, to identify the portion of computing resource availability data.

At operation 304, a list of software components hosted by hardware resources and computing resources consumed by each software component in the list of software components may be obtained. The list of the software components and the computing resources consumed by each of the software components may be obtained by: (i) receiving, by the management controller and via an out-of-band communication channel, instruction from a cloud management system, (ii) providing, by the management controller and to the agent, the instruction to the agent to obtain the list of the software components and the computing resources consumed by each of the software components, (iii) receiving, by the management controller and from the agent and in response to providing the instruction, a data package comprising data responsive to the instruction, and/or (iv) any other methods.

Receiving the instruction by the management controller may include receiving, via the out-of-band communication channel, a notification from the cloud management system in the form of a message and reading the message to identify the instruction.

Providing the instruction to the agent may include transmitting the instruction over the sideband communication channel to the agent.

Receiving the data package by the management controller may include: (i) generating the data package by the agent, (ii) receiving, by the management controller, the data package in the form of a message and reading the message to identify the data responsive to the instruction.

At operation 306, a software load analysis process may be performed to identify an action set to be performed to meet operation quality goals for the data processing system. The software load analysis process may be performed using, at least in part, the computing resource availability data, the list of software components, the computing resources consumed by each of the software components, and a policy library.

The software load analysis process may be performed by: (i) identifying policies for the data processing system, the policies being stored in the policy library and each policy of the policies indicating a standard for computing resource availability for each of the computing resources, (ii) performing, for each policy of the policies, a comparison between the standard indicated by a corresponding policy and the computing resources consumed by each of the software components, and the computing resource availability data to obtain a list of violated policies of the policies, (iii) in an instance of the performing where the list of violated policies is not empty: for each policy of the list of violated policies, identifying a remediation course associated with the respective policy to obtain remediation courses; and using the remediation courses to obtain the action set to be performed in order to meet the operation quality goals.

At operation 308, the action set to update operation of the data processing system may be performed. Performing the action set may enable the data processing system to provide the computer implemented services in a manner that meets the operation quality goals for the data processing system. The action set may be performed by: (i) removing, by the management controller, an existing instance of an application (e.g., from the hardware resources of the data processing system), (ii) installing a lower resource consumption version of the application, and/or (iii) any other methods.

The method may end following operation 308.

Figure 4:
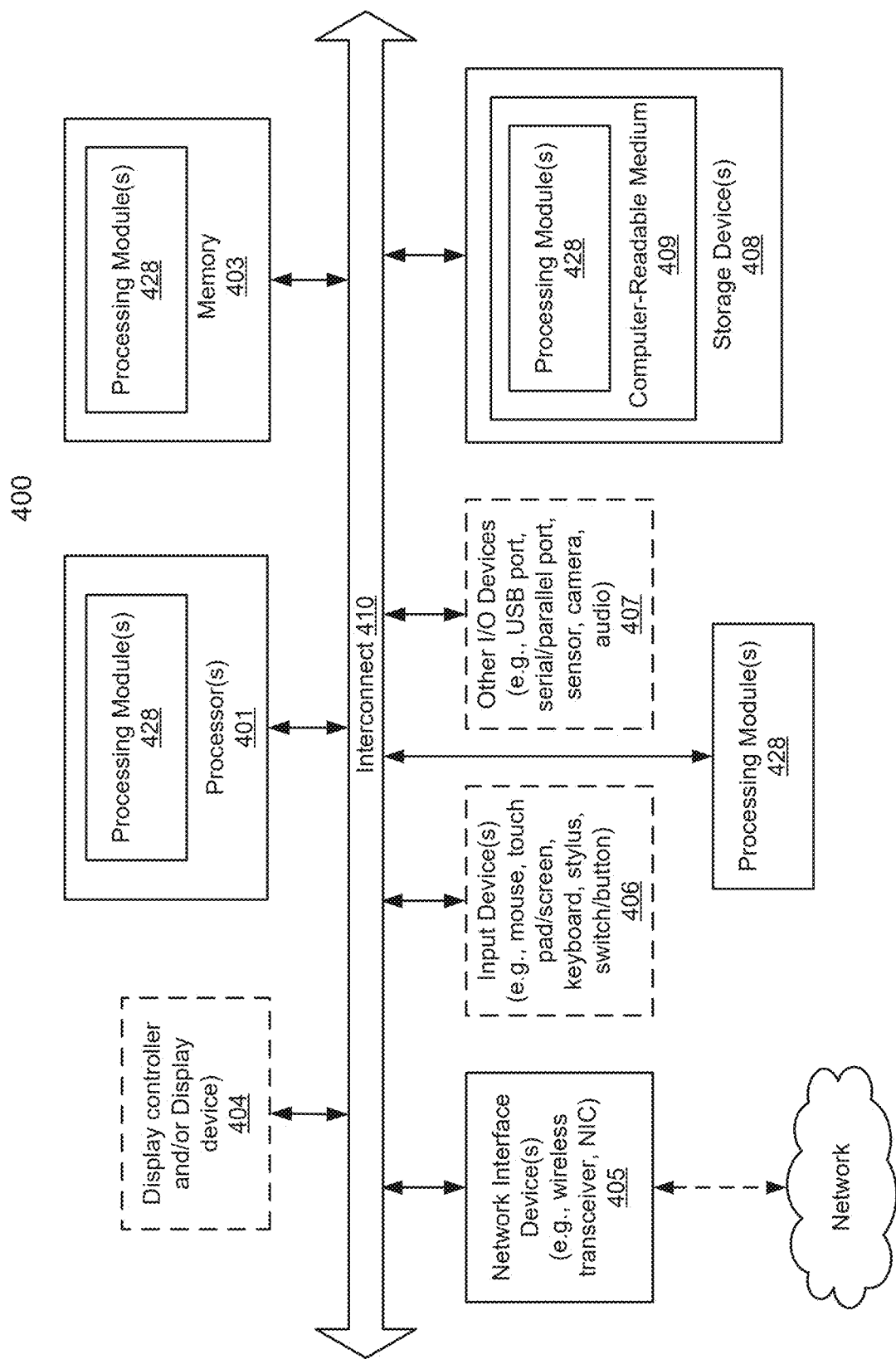
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
    identifying an occurrence of a trigger event for the data processing system;
    based on the occurrence:
        obtaining, by a hardware management controller of the data processing system and using an out-of-band communication channel between the hardware management controller and a remote entity, computing resource availability data for computing resources for providing computer implemented services, the computing resources being provided by hardware resources of the data processing system that are distinct from the hardware management controller, and the out-of-band communication channel bypassing the hardware resources,
        obtaining, by an agent hosted by the hardware resources of the data processing system, a list of software components hosted by the hardware resources and computing resources consumed by each software component in the list of software components, the computing resources consumed by each software component specifying, at least, processing resources consumed;
        performing, by the hardware management controller and using a side band channel to the agent, a software load analysis process using, at least in part, the computing resource availability data, the list of software components, the computing resources consumed by each of the software components, and a policy library, to identify an action set to be performed to meet operation quality goals for the data processing system; and
        performing, by the hardware management controller and using the side band channel, the action set to update operation of the hardware resources of the data processing system to enable the data processing system to provide the computer implemented services in a manner that meets the operation quality goals for the data processing system.

2. The method of claim 1, wherein in an instance of the identifying where the occurrence of the trigger event is an administrator sending instructions to the data processing system, the instructions indicate performance of a management process by the data processing system.

3. The method of claim 1, wherein in an instance of the identifying where the occurrence of the trigger event is based on a scheduled point in time.

4. The method of claim 1, wherein obtaining the computing resource availability data comprises:
    providing, via the hardware management controller of the data processing system, a request to the agent hosted by the hardware resources, the request indicating a portion of computing resource availability data for the data processing system; and
    receiving, by the hardware management controller and from the agent, the portion of computing resource availability data.

5. The method of claim 4, wherein the computing resource availability data comprises available data for processing resources provided by at least one processor of the hardware and at least one computing resource selected from a group of computing resources consisting of:
    memory resources provided by at least one memory devices of the hardware resources;
    persistent storage resources provided by at least one storage device of the hardware resources; and
    communication resources provided by at least one communication device of the hardware resources.

6. The method of claim 1, wherein obtaining the list of the software components and the computing resources consumed by each of the software components comprises:
    receiving, by the hardware management controller and via the out-of-band communication channel, instruction from a cloud management system;
    providing, by the hardware management controller and to the agent, the instruction to the agent to obtain the list of the software components and the computing resources consumed by each of the software components; and
    receiving, by the hardware management controller and from the agent and in response to providing the instruction, a data package comprising data responsive to the instruction.

7. The method of claim 6, wherein the data responsive to the instruction comprises the list of the software components and the computing resources consumed by each of the software components.

8. The method of claim 1, wherein performing the software load analysis process comprises:
    identifying policies for the data processing system, the policies being stored in the policy library and each policy of the policies indicating a standard for computing resource availability for each of the computing resources;
    performing, for each policy of the policies, a comparison between the standard indicated by a corresponding policy and the computing resources consumed by each of the software components, and the computing resource availability data to obtain a list of violated policies of the policies;
    in an instance of the performing where the list of violated policies is not empty:
        for each policy of the list of violated policies, identifying a remediation course associated with the respective policy to obtain remediation courses; and
        using the remediation courses to obtain the action set to be performed in order to meet the operation quality goals.

9. The method of claim 8, wherein each of the policies specifies a corresponding standard and the remediation course when the standard is not met.

10. The method of claim 1, wherein the policy library stores policies for the data processing system usable to manage hardware resource usage in order to meet the operation quality goals, and the operation quality goals for the data processing system setting minimum requirements for the computing resources to allow a user's perceived operation of the data processing system to meet a user experience standard.

11. The method of claim 1, wherein the action set specifies removal of an existing instance of an application hosted by the hardware resources and installation of a lower resource consumption version of the application on the hardware resources.

12. The method of claim 1, wherein the data processing system comprises the hardware resources and a network module adapted to separately advertise network endpoints for the hardware management controller and the hardware resources of the data processing system, the network endpoints being usable by a server to address communications to the hardware resources using an in-band communication channel and the hardware management controller using the out-of-band communication channel.

13. The method of claim 12, wherein the hardware management controller and the network module are on separate power domains from the hardware resources so that the hardware management controller and the network module are operable while the hardware resources are inoperable.

14. The method of claim 12, wherein the out-of-band communication channel runs through the network module, and an in-band communication channel that services the hardware resources also runs through the network module.

15. The method of claim 12, wherein the network module hosts a transmission control protocol/internet protocol (TCP/IP) stack to facilitate network communications via the out-of-band communication channel.

16. A non-transitory machine-readable medium having instructions stored therein, which when executed by a processor, operations for managing operation of a data processing system to be performed, the operations comprising:
    identifying an occurrence of a trigger event for the data processing system;
    based on the occurrence:
        obtaining, by a hardware management controller of the data processing system and using an out-of-band communication channel between the hardware management controller and a remote entity, computing resource availability data for computing resources for providing computer implemented services, the computing resources being provided by hardware resources of the data processing system that are distinct from the hardware management controller, and the out-of-band communication channel bypassing the hardware resources,
        obtaining, by an agent hosted by the hardware resources of the data processing system, a list of software components hosted by the hardware resources and computing resources consumed by each software component in the list of software components, the computing resources consumed by each software component specifying, at least, processing resources consumed;
        performing, by the hardware management controller and using a side band channel to the agent, a software load analysis process using, at least in part, the computing resource availability data, the list of software components, the computing resources consumed by each of the software components, and a policy library, to identify an action set to be performed to meet operation quality goals for the data processing system; and
        performing, by the hardware management controller and using the side band channel, the action set to update operation of the hardware resources of the data processing system to enable the data processing system to provide the computer implemented services in a manner that meets the operation quality goals for the data processing system.

17. The non-transitory machine-readable medium of claim 16, wherein in an instance of the identifying where the occurrence of the trigger event is an administrator sending instructions to the data processing system, the instructions indicate performance of a management process by the data processing system.

18. The non-transitory machine-readable medium of claim 16, wherein in an instance of the identifying where the occurrence of the trigger event is based on a scheduled point in time.

19. A data processing system, comprising:
    a processor; and
    a memory coupled to the processor to store instructions, which when executed by the processor, cause operations for managing operations of the data processing system to be performed, the operations comprising:
        identifying an occurrence of a trigger event for the data processing system;
        based on the occurrence:
            obtaining, by a hardware management controller of the data processing system and using an out-of-band communication channel between the hardware management controller and a remote entity, computing resource availability data for computing resources for providing computer implemented services, the computing resources being provided by hardware resources of the data processing system that are distinct from the hardware management controller, and the out-of-band communication channel bypassing the hardware resources,
            obtaining, by an agent hosted by the hardware resources of the data processing system, a list of software components hosted by the hardware resources and computing resources consumed by each software component in the list of software components, the computing resources consumed by each software component specifying, at least, processing resources consumed;
            performing, by the hardware management controller and using a side band channel to the agent, a software load analysis process using, at least in part, the computing resource availability data, the list of software components, the computing resources consumed by each of the software components, and a policy library, to identify an action set to be performed to meet operation quality goals for the data processing system; and
            performing, by the hardware management controller and using the side band channel, the action set to update operation of the hardware resources of the data processing system to enable the data processing system to provide the computer implemented services in a manner that meets the operation quality goals for the data processing system.

20. The data processing system of claim 19, wherein in an instance of the identifying where the occurrence of the trigger event is an administrator sending instructions to the data processing system, the instructions indicate performance of a management process by the data processing system.

* * * * *